United States Patent [19]

Singer, Jr.

[11] Patent Number: 4,729,064

[45] Date of Patent: Mar. 1, 1988

[54] MODULAR INTERCONNECT BLOCK WITH PROTECTOR STRUCTURE

[75] Inventor: Loren A. Singer, Jr., Minneapolis, Minn.

[73] Assignee: ADC Telecommunications, Inc., Minneapolis, Minn. 55435

[21] Appl. No.: 707,610

[22] Filed: Mar. 4, 1985

[51] Int. Cl.$^4$ ............................................. H01R 9/00
[52] U.S. Cl. ..................................... 361/426; 361/119; 361/427; 361/428; 379/332; 439/709; 439/716
[58] Field of Search ................. 179/91 R, 98; 339/98, 339/108 TP, 103 R, 198 P, 258 R; 361/119, 124, 392–395, 399, 426–429

[56] References Cited

U.S. PATENT DOCUMENTS

| | | | |
|---|---|---|---|
| 3,226,669 | 12/1965 | Lutz | 179/98 |
| 3,255,330 | 6/1966 | MacKenzie et al. | 361/124 |
| 3,514,743 | 5/1970 | Schantz . | |
| 3,760,328 | 9/1973 | Georgopulos | 179/98 |
| 3,778,750 | 12/1973 | Caveney et al. . | |
| 3,860,318 | 1/1975 | Reavis, Jr. et al. . | |
| 3,936,133 | 2/1976 | Splitt et al. | 361/426 |
| 3,964,816 | 6/1976 | Narozny . | |
| 4,057,692 | 11/1977 | DeBortoli et al. | 179/98 |
| 4,146,755 | 3/1979 | Caussé | 361/119 |
| 4,150,867 | 4/1979 | Knickerbocker . | |
| 4,159,158 | 6/1979 | Weidler . | |
| 4,160,574 | 7/1979 | DeRoss . | |
| 4,163,596 | 8/1979 | Aysta et al. . | |
| 4,210,370 | 7/1980 | Vachhani et al. . | |
| 4,236,778 | 12/1980 | Hughes et al. . | |
| 4,241,970 | 12/1980 | Rider, Jr. et al. . | |
| 4,255,009 | 3/1981 | Clark . | |
| 4,283,105 | 8/1981 | Ferrill et al. . | |
| 4,286,836 | 9/1981 | Rumps . | |
| 4,504,883 | 3/1985 | Uchida et al. | 361/119 |

FOREIGN PATENT DOCUMENTS 2042833  9/1980  United Kingdom ................ 361/119

OTHER PUBLICATIONS

"MDF: Planning and Engineering Guidelines," Bell System, Aug. 1976.
"Type C-388 Main Frame Connector Equipment and Accessories Description," Cook Electric Div. of Northern Telecom, Inc. Sec. 388-1007, 12/1/81, Issure #1.
"Cook Electric's C-388 Connector," Cook Electric Division of Northern Telecom, Inc., Sales Brochure, 1982.
"Center Feed," Reliance Comm/TEC Sales Brochure, Jan. 1984.
"Cheetah Backboard Porta Systems Product Information," 130F ML 7500 8/83.
"Jack's Test 44–47 & Protector Modules, British Telecommunications, updated.
"LSA-Plug Quick Connection Technique," Krone GmbH 0.208.1281.050.07, date unknown.
"LSA-Plug Wall Distribution Frame," Krone GmbH, 210.003-10-83.060.07, date unknown.
Marsalcatel Sales Brochures: 64 pair I.D.C.; Connect-Disconnect-Terminal Block 100 pair I.D.C.; Connect/Disconnect-Terminal Block; and 100 pair protected I.D.C. Connect/Disconnect-Terminal Block:

(List continued on next page.)

Primary Examiner—A. D. Pellinen
Assistant Examiner—Gregory D. Thompson
Attorney, Agent, or Firm—Merchant, Gould, Smith, Edell, Welter & Schmidt

[57] ABSTRACT

A distribution frame comprising interconnect block modules for use in telecommunications is disclosed. The frame is front accessible for both wiring and test access. The structure incorporates a reversible wire guide to facilitate wiring of a module from either the right or left hand side of a particular mounting bracket. The individual modules incorporate an overload protector element which utilizes a printed circuit board as a primary contact structure. The individual modules also use split cylinder insulation displacement connectors which are readily accessible from the front of the module and terminate in spring fingers which make contact to the overload protector elements.

23 Claims, 13 Drawing Figures

OTHER PUBLICATIONS

Aug. 1983, Mar. 1983 and Jul. 1983, respectively.
"Porta Systems Frame Book," Issue 3, Sept. 1983.
"Porta Systems Product Information," 130E-ML 7500 (Aug. 1983), 130M ML 1000 (Nov. 1982) and 130K ML 7500 (Aug. 1983).
"Protection (MPC Connector): QCM486 Connector," T 80 Section 1, Northern Telecom, Dec. 1981.
"R355 Central Office Connector," Sales Brochure, Reliance Com/Tec, date unknown.
"Series 876 Main Distribution Frames," Connectral, Apr. 1983.
"SX -5, -10, -20, -100 and -200 Sales Brhcure, Siemon Co., Nov. 1983.
"Telecommunications Connecting Technique: LSA--Plug," Quante Fernmeldetechnik, 07-004-617, Sept. 1982.

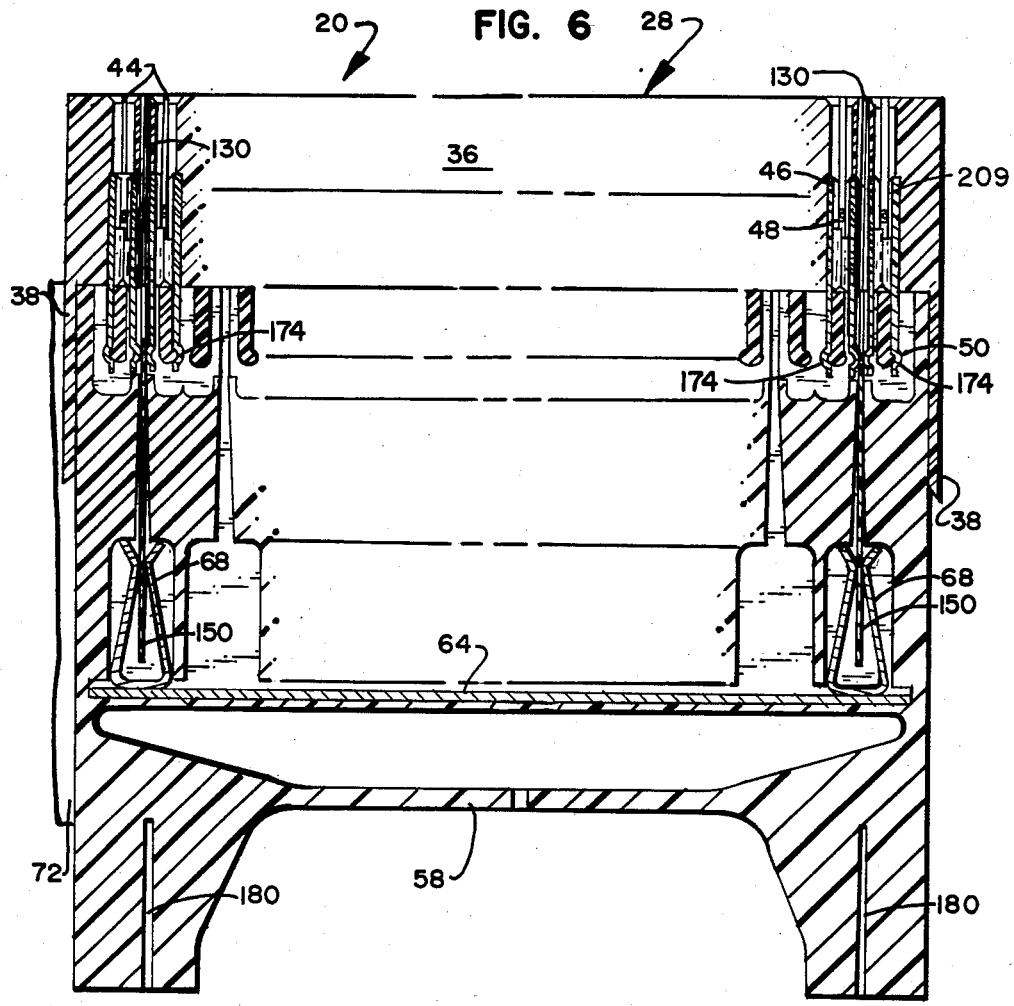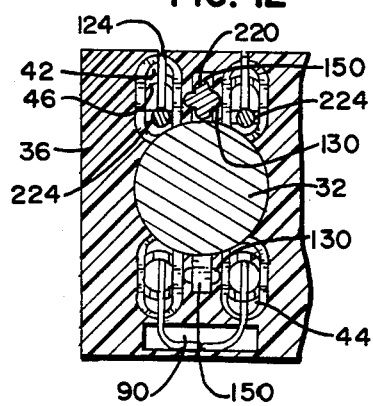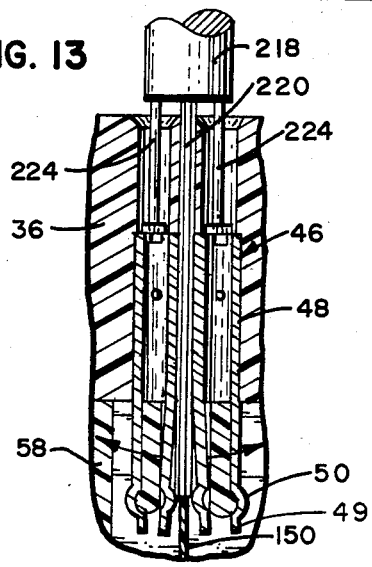

MODULAR INTERCONNECT BLOCK WITH PROTECTOR STRUCTURE

TECHNICAL FIELD OF THE INVENTION

The present invention pertains generally to the field of telecommunications, and more particularly to the structure of distribution frames comprising modular interconnect blocks for distributing or cross-connecting incoming telecommunication lines, the blocks including overload protectors and test access features for such lines.

BACKGROUND OF THE INVENTION

Distribution frames are widely used in the telecommunications industry to interconnect equipment and distribution lines. Typical distribution frames consist of a panel containing a number of connection terminals, such as wire wrapped post or insulation displacement terminals. The terminals are mounted on panels of flat sheet metal members such that the lines entering or leaving a particular distribution frame may be connected directly to the terminals. Typically the distribution lines and the equipment lines are connected to the rear side of the panel, while the cross-connection lines between the terminals are connected from the front side.

Distribution frames conventional in the prior art also include "protection" for operators and equipment. This may be provided either by overvoltage protection circuits or overcurrent protection circuits which are wired between the equipment and distribution lines to protect against transfer from the distribution lines to equipment or equipment operators environmental hazards such as lightning, the effects of which would otherwise be routed directly to electrical equipment interfaced with the lines on the distribution frames.

Distribution frames of this type have many disadvantages. One is that typically it is difficult to access and test individual lines either in the distribution line direction or the equipment direction from the front of the distribution frame panel. Another disadvantage is that many such systems must be wired from one side of the panel and then cross-connected from the other side, making access to the panel durring the wiring process difficult and cumbersome. Third, overvoltage protector devices in the prior art are often expensive to fabricate, and subject to reliability problems. Fourth, systems in the prior art typically have different connection terminals, one set for incoming and outgoing leads and another set for cross-connect functions, which adds to expense and complexity. Fifth, many frames currently on the market comprise large panels, as opposed to a modular approach.

SUMMARY OF THE INVENTION

In response to the above-identified disadvantages of typical distribution frames, the present invention is directed to a distribution frame made from a number of interconnect block modules, each of which has equipment leads, distribution leads, and cross-connect leads connected to front access terminals. This promotes both simplicity and cost effectiveness in wiring and testing.

According to one aspect of the invention, a plurality of modules fasten readily into an associated bracket structure. Each of the modules includes a plurality of individual circuit protector devices which insert from a front face thereof. Immediately adjacent the circuit protector structure is a plurality of insulation displacement terminals, each of which has an associated spring contact extension which makes contact with the overload protector. The contact between one of these terminals and the protector may be broken by a probe insertable into an aperture in the front face of the module. The probe flexes a finger-like spring contact extension of the terminal away from the protector contact, at the same time allowing electrical contact with the individual contact extension for test purposes.

According to another aspect of the invention, the individual modules have wire guide structure which provides individual channels for wires to allow front access to both equipment and distribution line connections. The wire guide structure further provides for strain relief.

According to still another aspect of the invention, each protection device includes a two-part cylindrical protector cover, having a printed circuit board therein, the ends of which extend outward from the protector cover. The printed circuit board has printed conductors which connect with the insulation displacement connector contact extensions. The board holds an overvoltage or overcurrent protector, encapsulated by the protector cover. The board extends on opposite sides of the protector, one end contacting a ground clip, and the other end connecting with the associated contact extensions of the terminals.

The resulting system is compact, cost effective, and provides ready front access both for purposes of testing and wiring. These and other salient features of this invention, together with other advantages which result from various classes of embodiments, are described in more detail in the following specification and drawings.

BRIEF DESCRIPTION OF THE DRAWINGS

FIG. 6 is a sectional view taken generally along lines 6—6 as shown in FIG. 4;

FIGS. 12 and 13 are sectional views illustrating the test access features of the present invention.

DETAILED DESCRIPTION OF THE INVENTION

Figure 1:
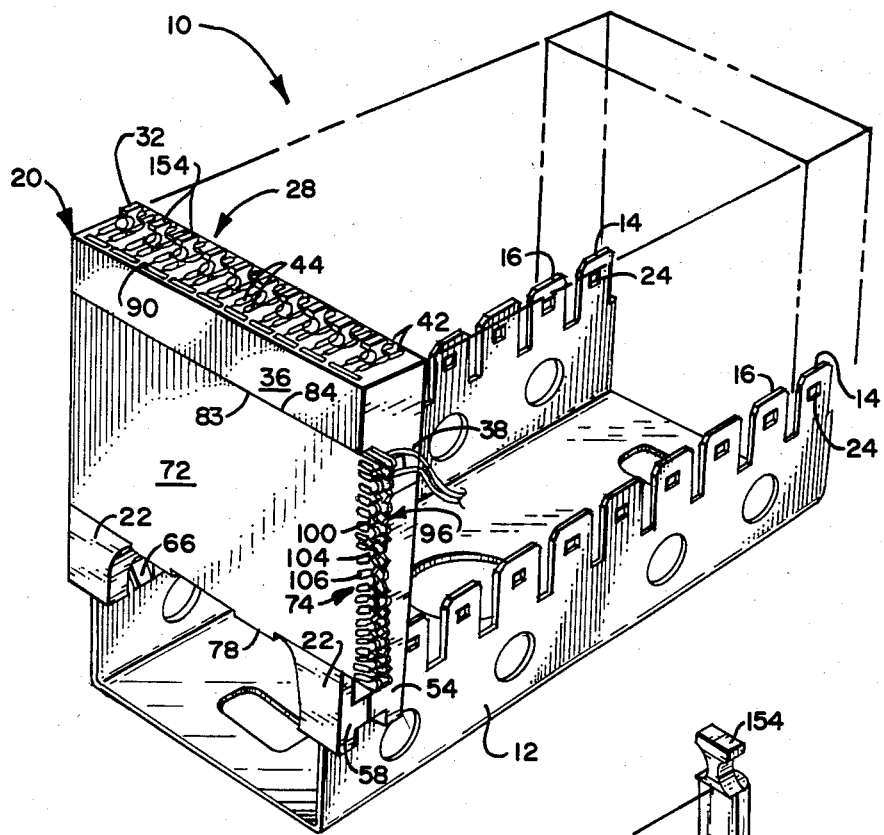
FIG. 1 is a perspective view showing one form of bracket for use with a number of modules of the present invention, one of which is shown assembled to the bracket.

A particular preferred embodiment of a distribution frame including interconnect block modules according to the present invention is shown in the drawings. With reference particularly to FIG. 1, there appear portions of the distribution frame generally designated with reference numeral 10. Distribution frame 10 is made up of a U-shaped mounting bracket 12, with the legs of the U having individual pairs of mounting tabs, two pairs of which are labeled 14, 14, and 16, 16 respectively. Each pair of mounting tabs accepts an individual interconnect block module 20, so that bracket 12 is configured to accept a total of 10 interconnect block modules 20.

Module 20 is a structure having a pair of individual mounting legs 22, 22, each of which has a slot or recess into which an associated mounting tab from bracket 12 fits. As exemplified by the pair of mounting tabs 14, each mounting tab has a locking aperture 24. Each locking aperture 24 cooperates with a locking clip structure shown in more detail and described hereinafter with reference to FIG. 8.

Each module 20 has a front face 28 on which connections to distribution lines and equipment are made. Front face 28 also accepts individual protector elements, as shown more particularly in FIG. 2.

Front face 28 is a portion of a front cover 36 as shown. Front cover 36 is generally rectangular in shape and has two aperture ears 38 at opposite ends thereof to facilitate assembly of module 20. Front cover 36 is provided with a plurality of circularly cylindrical apertures 40. Each of these apertures is sized to accept an associated overload protector element 32. Immediately adjacent each aperture 40 are pairs of terminal or connector apertures 42 and 44.

Figure 2:
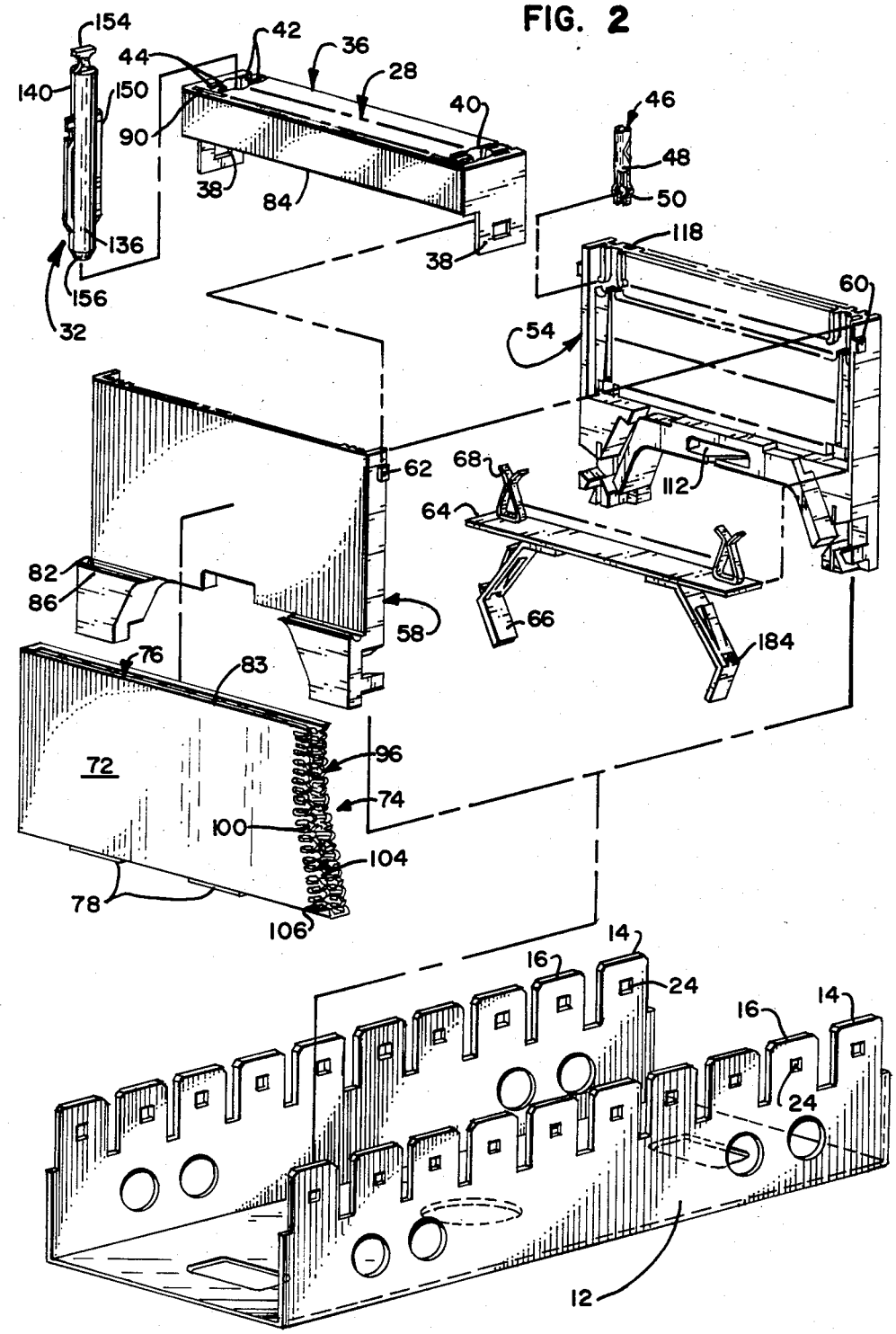
FIG. 2 is an exploded perspective view of the structure of FIG. 1 showing various details of construction.

In the embodiment shown each of these apertures provides access to a wire connector, both for purposes of wiring and testing. An individual one of said connectors is labeled with reference numeral 46, and is shown in FIG. 2. This connector is often referred to as a split cylinder insulation displacement connector, and contains an upper cylindrical portion 48 functioning as a wire terminating end, as well as a spring contact finger end 49 which includes a pair of contact extensions or spring fingers 50 which extend longitudinally downward therefrom. The upper cylindrical portion of connector 46 is preferably configured to accept more than one wire. An example of such structure is shown in U.S. Pat. No. 4,624,521.

Front cover 36 is fitted over module body 54. Module body 54 is structured to accept twenty pair of connectors 46 across its length. Front cover 36 and body 54 also mate with a body cover 58 to form a closed structure. Body 54 has an assembly lug 60 at each end thereof. Body cover 58 likewise has an assembly lug 62 at each end thereof. Lugs 60 and 62 are captured within the aperture of each of ears 38 in assembly as front cover 36 fits over body cover 58 and module body 54.

The lower part of module body 54 is provided with an irregularly shaped recess which supports a ground strip 64 and a pair of mounting clips 66. Mounting clips 66 may, in a certain class of preferred embodiments, be spot welded to metallic rectangular ground strip 64. Also attached to ground strip 64 are a plurality of metal grounding clips 68. Each of grounding clips 68 attaches to an associated grounding terminal on overload protector element 32 when it is inserted fully into module 20. Although two grounding clips are shown in FIG. 2, there would ordinarily be ten grounding clips spaced offset with respect to the center of ground strip 64 but longitudinally across the length of strip 64.

Also shown in FIG. 2 is a connecting wire guide 72, which, together with cover 36, body 54, and body cover 58 make up the primary structure of module 20. It is contemplated that elements 36, 54, 58 and 72 would typically be molded from plastic or other suitable nonconductive material.

Connecting wire guide 72 is basically a rectangular structure with the exception of a strain relief configuration 74 along the right edge as shown in FIG. 2. In use, wires from equipment to module body 54 initially pass through strain relief 74 at the right side of guide 72 then through a closed rectangular section passageway to any one of a number of longitudinally spaced wire exits 76 (see also FIG. 5). Wire guide 72 has two elongate assembly projections 78 along its bottom closed edge. Assembly projections 78 mate with assembly grooves 82 to lock wire guide structure 72 as part of the module. A side edge 83 fits flush against a lower surface 84 of cover 36 so that guide 72 is captivated between an offset portion 86 of body cover 58 and front cover 36. As shown more particularly in FIG. 4, front cover 36 has individual wire exit extensions 90 which register with wire exits 76 to provide a continuous passageway for wire up through front face 28 of cover 36.

Figure 5:
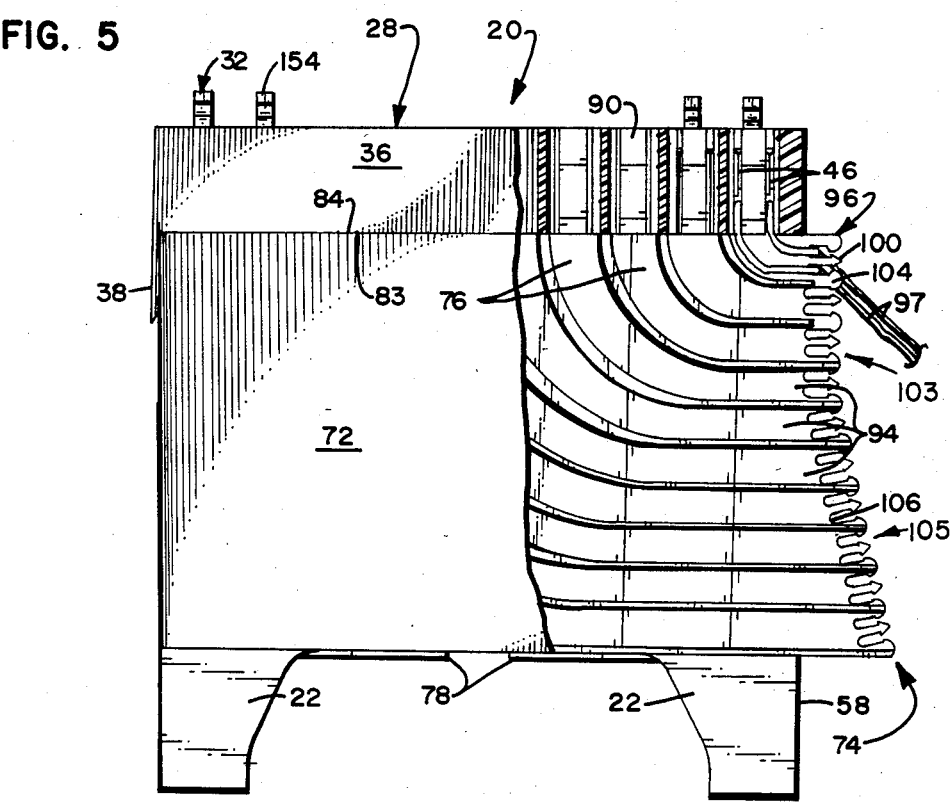
FIG. 5 is a side elevation with portions broken away and shown in cross-section to illustrate use of the module shown in FIGS. 1 and 4.
Figure 11:
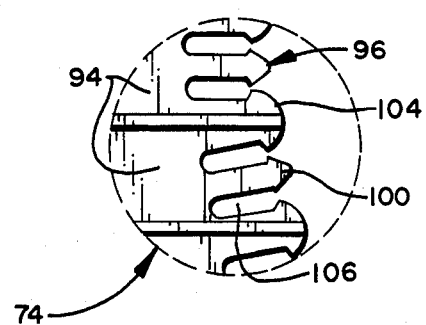
FIG. 11 is an enlarged view of a section of the strain relief of the wire guide structure shown in FIG. 5.

As shown in FIG. 5, each passageway 94 is typically capable of directing two connecting wires and each has a horizontal portion which runs horizontally and has an arcuate bend portion which gently directs the wires upwardly to wire exit 76. Also shown in partial section in FIG. 5 is a portion of front cover 36. Front cover 36, as previously mentioned has a plurality of wire exit extensions 90 which guide the wires upwardly and out front face 28. The details of construction of the strain relief of wire guide 72 are shown more particularly in the enlarged view of FIG. 11 taken in combination with the view of FIG. 5. In FIG. 5, a pair of wires are shown connected in the right most passageway of wire guide 72. The connection of these wires 97 to each of a pair of connectors 46 is protected by means of individual strain relief elements 96. Strain relief elements 96, in the particular embodiment shown, include a central arrow-shaped projection 100 for each passageway. On each side of the arrow-shaped projections 100, there is a corresponding bulb-shaped projection 104. The arrow-shaped outer end of projection 100 and the bulb-shaped outer end of projection 104 combine to create a narrow passageway which captivates an individual wire placed through the narrow entry and into a recess, an example of which is labeled recess 106 in FIG. 11. It will be noted that the strain relief side of wire guide 72 has a straight section 103 followed by a segment 105 which is angled outward. This is to facilitate easy connection and passage of wires through the wire guide. In addition, there are strain relief elements formed on both the front and back walls 95 of wire guide 72 as appears clearly in FIG. 2. This permits wire guide 72 to be reversed in a left to right direction so that wires may enter from either side of mounting bracket 12 to a particular module.

Figure 7:
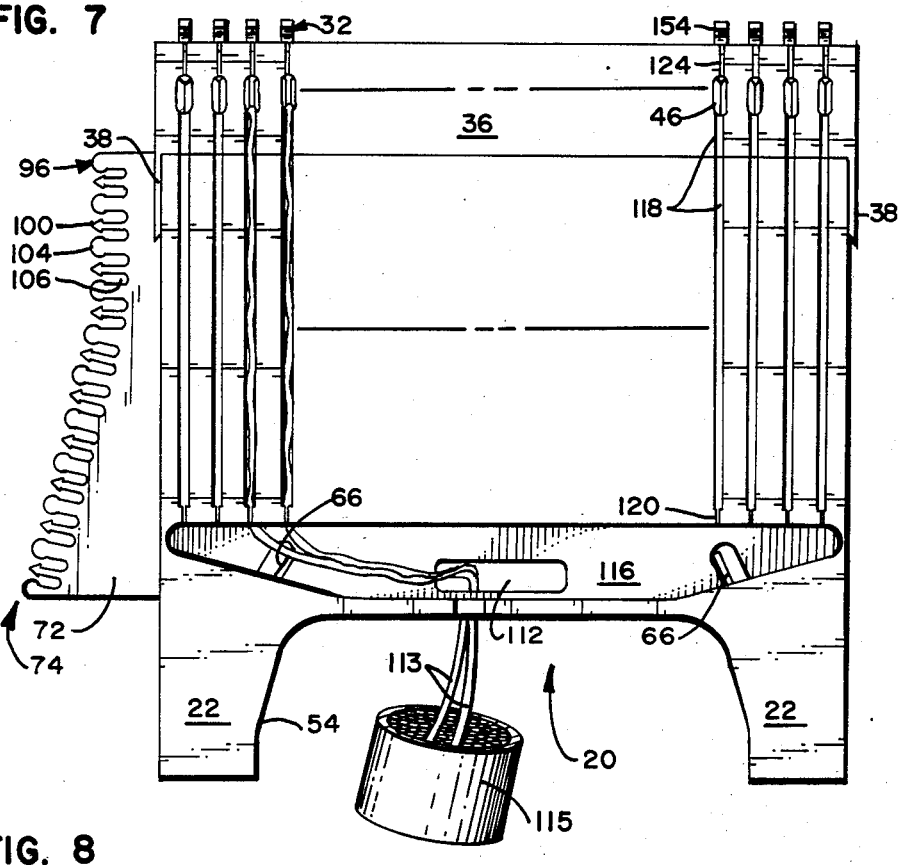
FIG. 7 is a side elevation of the module as shown in FIGS. 4 and 5 from the side opposite that which is shown in FIG. 5.

FIG. 7 shows the reverse side of module body 54, and structure which provides a mechanism for wiring the reverse side of module 20. In FIG. 7, there is shown a wire feed aperture 112, which receives wires 113 from an incoming feed cable 115 for routing to appropriate connection terminals. Aperture 112 feeds into a wire distribution recess 116 which is generally trapezoidal in shape and provides a space for individual wires to feed to each of a plurality of wire guide grooves 118. In a typical structure of the type shown in FIG. 7, with ten protectors, there are twenty individual wire guide grooves 118. Although in the fully wired condition each of these grooves is filled, in the example shown in FIG. 7, only two wires are fed through aperture 112 across distribution recess 116 and into a pair of wire guide grooves upwardly for connection to connectors 46. The reverse side of body 54 as shown in FIG. 7 also includes narrowed sections 120 and 124 at opposite ends of wire guide grooves 118 to provide strain relief for the wires.

Figure 4:
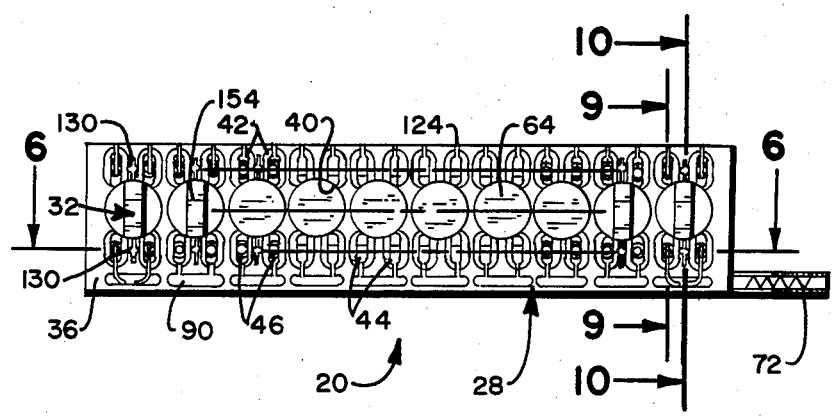
FIG. 4 is a plan view of a module constructed according to the invention as shown in FIG. 1.

In FIG. 4 of the drawings, associated with each of apertures 40 are four individual contacts or connectors 46. One pair of connectors 46 accepts connecting wires from wire exit extensions 90, while the opposite pair accepts wires from wire guide grooves 118. In use, wire is guided through the guideways on each of the sides of module 20 including the strain relief sections, and across the tops of split cylinder connectors 46. A connection tool 200 having a tip (see FIG. 9) is used to perform wire cutoff, insulation displacement and wire to connector connection in the same operation.

Figure 10:
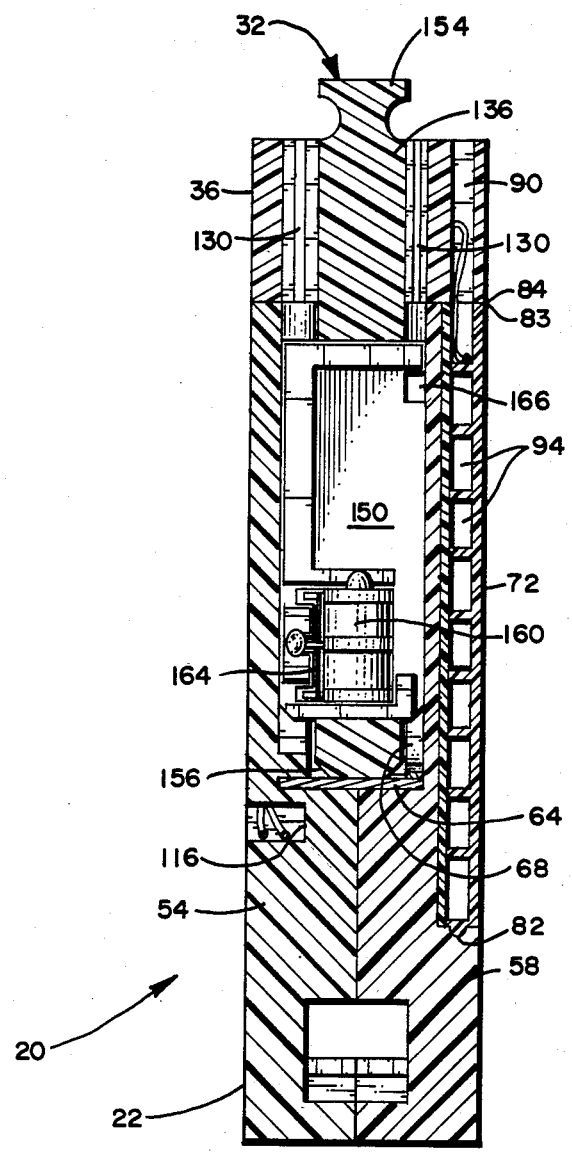
FIG. 10 is a sectional view taken along the lines 10—10 of FIG. 4.

Also shown in FIG. 4 are the ends of four overload protector elements 32, two each at the ends of front face 28. A pair of cross-shaped apertures 130 are formed on opposed sides of each of apertures 40. As shown in FIG. 10, when an overload protector element 32 is placed in one of apertures 40, the portions of the printed circuit board 150 which extend beyond the cylindrical cover of element 32 slide into elongate cross shaped apertures 130 and downward into the module to make appropriate contact with grounding clips 68 and connector spring fingers 50. Cross shaped apertures 130 are also used for the purpose of what is typically referred to in the art as "break access" testing. This is a testing procedure in which a break in the circuit is made as part of the testing of equipment or of testing the condition of a distribution line.

Figure 3:
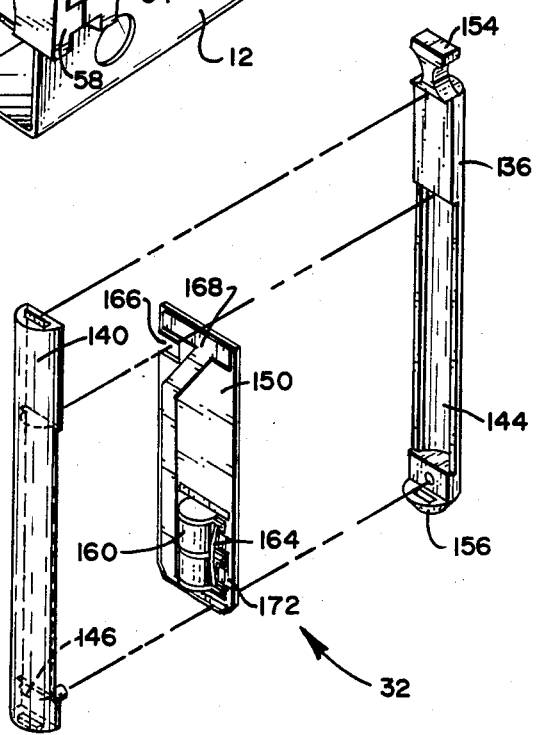
FIG. 3 is an exploded perspective view of a protector element constructed according to one embodiment of the present invention.

As shown in FIG. 3, a first protector cover half 136 is formed to mate with a second protector cover half 140 to form a cover which is generally circularly cylindrical in shape. Cover halves 136 and 140 have recesses 144 and 146, respectively, which accept a printed circuit board element 150. At one end of protector cover half 136 is a protector handle 154 which allows ready insertion and removal. At the opposite end of cover half 136 is a truncated cone shaped end 156. Printed circuit board 150 includes a conventional overload protection device, which in the embodiment shown is a gas overvoltage protection device having a gas discharge element 160. Alternatively, over-current protection could be incorporated on printed circuit board 150. In the embodiment shown, the element 160 senses an over-voltage condition and shunts to ground if over-voltage occurs. If the over-voltage continues for an extended time, element 160 heats up until an insulated wire shunt 164 becomes effective. At that point, the insulation on insulated wire shunt 164 melts and creates an alternate path to ground so that heating of element 160 is discontinued. Printed circuit board 150 preferably has a notch 166 which cooperates with contact fingers 50 of connector 46 so that by means of a slight upward shift of protector element 32, contact between fingers 50 and the associated circuit board contact 168 is readily broken.

FIG. 6 illustrates the internal structure of module 20 when protector 32 is inserted therein.

Figure 8:
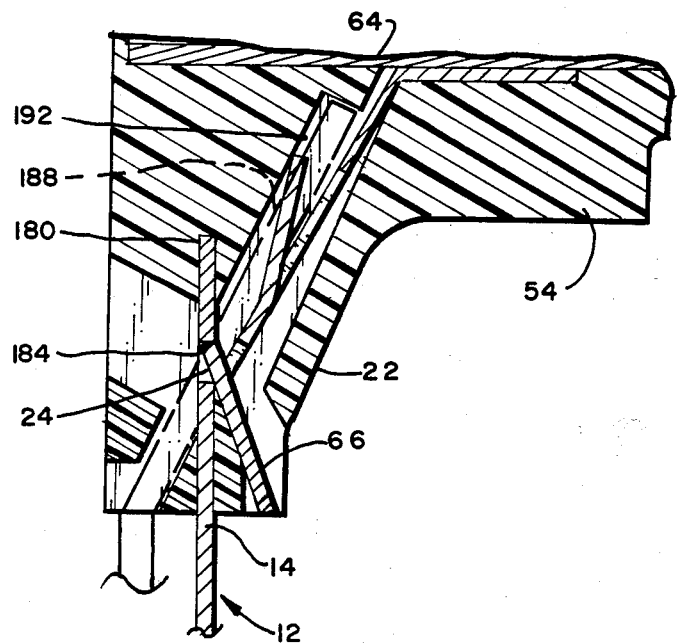
FIG. 8 is a sectional view showing a portion of the mounting structure of the module.

A portion of printed circuit board 150 is shown in contact with clips 68, identified as ground contact 172 in FIG. 3. Also shown in FIG. 6 is the contact of the fingers 50 with appropriate contacts on printed circuit boards 150. Fingers 50 are formed with rounded projections 174 thereon. As indicated hereinbefore, in FIG. 8, a mounting tab 14 extends upward into a recess 180 in leg 22 of module 20. As previously discussed each of the mounting tabs 14 has a locking aperture 24. As legs 22 are moved over tab 14, a projection 184 mates with aperture 24 to firmly mount the module. Also shown in broken lines in FIG. 8 is an alternate form of the mounting tab, wherein a singular, angular tab or bracket 188 extends upward into a mating, angled recess or groove 192 in leg 22. With the construction shown, mounting clips 66 are configured to accept either type of mounting without modification.

Figure 9:
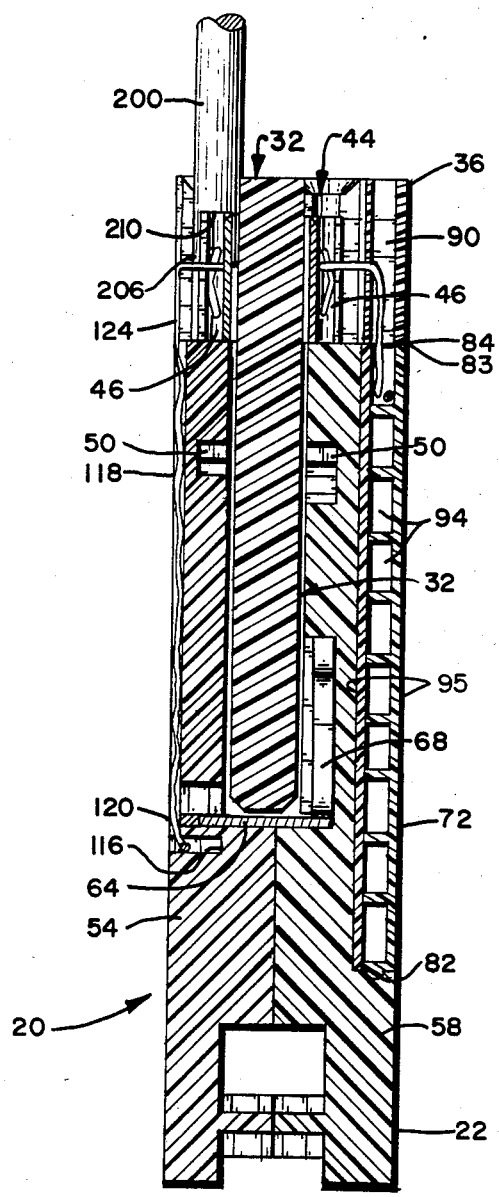
FIG. 9 is a sectional view taken along lines 9—9 of FIG. 4.

FIG. 9 shows a portion of a mounting tool installing a wire in connector 46. The tool tip 200 is configured to have a central, circularly cylindrical element which extends downward into the insulation displacement connector. Tool tip 200 also has a portion 206 which surrounds the cylindrical element and forces the wire downward into the insulation displacement slot 209 for connection. Portion 206 cuts off excess wire on the oppposite side of the connector. In addition, tool tip 200 has a shoulder 210 which mates with the top edge of connector 46 to define the final vertical position of the wire being connected.

FIGS. 12 and 13 illustrate the break access and test feature. A test probe 218 having a central cross shaped elongate projection 220 fits downward into mating aperture 130 in front face 28 to separate fingers 50 from the contacts on PC board 150 as shown by the arrows in FIG. 13. At the same time, probe 218 has a pair of spring loaded contacts 224, which make resilient contact with the tops of connector elements 46. These actions break the wired circuit and make a test circuit as desired.

Although the present invention has been described above in a preferred form, those skilled in the art will readily appreciate that various modifications may be made without departing from the scope of the invention, and that the invention is therefore bounded only by the claims which follow.

What is claimed is:

1. A distribution frame module, comprising:
   (a) a generally rectangular module block having a front face with a plurality of first apertures and a plurality of second apertures in close proximity to each of the first apertures and a plurality of third apertures which are in open communication with said first apertures;
   (b) a plurality of wire connectors mounted in recessed position in the second apertures, said connectors each having a wire terminating end and a spring contact finger end, the spring contact finger end including a spring contact finger; and
   (c) an overload protector element having an external contact, the element being mounted in recessed position in one of the first apertures with said external contact extending into a recessed position in one of the third apertures to contact at least one of said spring contact fingers also extending into the recessed position in said one of the third apertures.

2. The module of claim 1, further including wire guide means, the wire guide means comprising a generally rectangular structure with passageways for entry of wires along one side thereof and exits along an adjacent generally transverse side, to facilitate wiring entry and connection of the block, the wire guide means being mounted to one side of the block.

3. The module of claim 2, wherein the wire guide means is reversible in assembly to the block.

4. The module of claim 2, wherein the passageways for entry have individual strain relief means, said passageways being formed to have a lower portion at an obtuse angle to the exit side of the wire guide means.

5. A distribution frame wherein electrical lines forming portions of an electrical network are interconnected at said frame, said frame comprising:
   means for protecting said network from transient electrical signals:
   means for connecting said lines to said protecting means;
   a module with a front face, said module including means for holding said protecting means and said connecting means said module further including means for accessing said protecting means and said connecting means through said front face, said module also including means for routing said lines from behind said front face to said connecting means;
   a bracket which supports said module;
   means for grounding said protecting means to said bracket; and
   means for attaching said grounding means to said bracket;
   whereby said electrical lins are kept behind said front face while said protecting means and said connecting means are accessed through said front face.

6. A distribution frame in accordance with claim 5 wherein said module includes a pair of spaced-apart legs with slots therein and wherein said bracket includes a pair of spaced-apart tabs for insertion into said slots, said grounding means including means for contacting said tabs.

7. A distribution frame in accordance with claim 6 wherein said grounding means includes a strip and a mounting first clip attached thereto, said first clip receiving said protecting means, said grounding means further including second mounting clips connecting to said bracket.

8. A distribution frame in accordance with claim 7 wherein said attaching means includes an aperture in each of said tabs of said bracket and said second clips of said grounding means each include a projection fitting into one of said apertures.

9. The distribution frame in accordance with claim 5 wherein said protecting means includes a circuit board having means for shunting to ground when heated, said protecting means further including first and second cover members which fit on at least portions of opposite sides of said circuit board, said circuit board having contacts extending beyond said first and second cover members, one of said contacts being received by said grounding means and another of said contacts being in electrical contact with said connecting means.

10. The distribution frame in accordance with claim 9 wherein said connecting means includes a plurality of connectors having a cylindrical portion from which spring fingers extend, at least one of said spring fingers contacting said circuit board, said cylindrical portion including means for contacting and retaining at least one of said electrical lines.

11. The distribution frame in accordance with claim 5 wherein said module includes a body and a body cover, said module further including a front cover and means for holding said body, said body cover and said front cover together, said grounding means being held between said body and said body cover, said module also accepting said connecting means, said protecting means being retained by said grounding means.

12. The distribution frame in accordance with claim 11 wherein said module includes an aperture and a wire distribution recess, said aperture opening into said recess, said aperture and said recess receiving a plurality of electrical lines, said module further including a plurality of wire guide grooves leading from said recess to said connecting means.

13. The distribution frame in accordance with claim 12 wherein said wire guide grooves include means for relieving strain on said wire extending therealong.

14. The distribution frame in accordance with claim 11 including a wire guide and means for attaching said wire guide to said module, said wire guide providing a plurality of channels which guide said electrical lines to said connecting means.

15. The distribution frame in accordance with claim 14 wherein said wire guide includes means for relieving strain on said guided lines.

16. A module for mounting on a bracket of a distribution frame, said module interconnecting first wires from an incoming feed cable to second wires from distribution lines, said module comprising:
   means for interconnecting a pair of said first wires with a pair of said second wires, said interconnecting means including means for protecting said first wires of said incoming feed cable and said second wires of said distribution lines from harmful signals;
   means for grounding said protecting means; and
   a primary structure having a front face and a rear, first and second opposite sides, and first and second opposite ends, said primary structure holding said interconnecting means and said grounding means, said primary structure further including first means for routing said first wires of said feed cable, said first routing means including a recess and an opening communicating with said recess, said first routing means further including a plurality of grooves communicating between said recess and said interconnecting means, said primary structure also including second means for routing said second wires of said distribution lines to said interconnecting means.

17. The module in accordance with claim 16 wherein said first routing means further includes means for relieving strain on said first wires, said strain relieving means being formed in a portion of said grooves.

18. The module in accordance with claim 16 wherein said second routing means includes a wire guide having a plurality of passageways extending from the first end of said primary structure toward the front face of said primary structure.

19. The module in accordance with claim 18 wherein said second routing means includes a wall with an edge along said first end of said primary structure, said second routing means further including means for relieving strain on said second wires being guided through the passageways, said strain relieving means including a recess formed between a bulb-shaped projection and an arrow-shape projection in said wall at said first end.

20. The module in accordance with claim 16 wherein said primary structure includes a body and a body cover, said primary structure further including a top cover and means for holding said body, said body cover and said top cover together, said body cover including an offset portion, said primary structure also including a wire guide and means for attaching said wire guide between said offset portion and said top cover.

21. The module in accordance with claim 20 wherein said front cover includes a plurality of apertures receiving said interconnecting means, and wherein said wire guide includes a plurality of passageways extending from the first end of said primary structure to the top cover, said passageways meeting with said apertures to provide guides for said second wires from said first end to said connecting means.

22. The module in accordance with claim 21 wherein the first end of said wire guide includes an end portion which extends beyond the first end of said body and said body cover, said end portion including means for relieving strain on said second wires guided by said wire guide, said end portion including a straight section and an outwardly angled section to facilitate passage of said second wires through said wire guide.

23. A module for mounting to a bracket of a distribution frame, said module interconnecting first wires from an incoming feed cable to second wires from distribution lines, said module comprising:

means for protecting said first wires of said incoming feed cable and said second wires of said distribution lines from a transient signal carried along the other, said protecting means including a circuit board having means for shunting to ground when sufficiently heated, said protecting means further including means for covering at least portions of opposite sides of said circuit board, said circuit board having contacts extending beyond said covering means;

means for connecting a pair of first wires with a pair of second wires, said connecting means including four connectors spaced about said protecting means, each of said connectors including a spring finger for contacting one of said contacts on said circuit board, each of said connectors further including means for retaining at least one of said lines;

means for grounding said protecting means;

a primary structure having a front face and a rear, first and second opposite sides, and first and second opposite ends, said primary structure holding said protecting means, said interconnecting means, and said grounding means, said primary structure further including first means for routing said first wires of said feed cable and second means for routing said second wires of said distribution lines, said first routing means including an aperture and a wire distribution recess, said aperture opening into said recess, said first routing means further including a plurality of wire grooves leading from said recess to at least two of said connectors, said wire grooves including first means for relieving strain on said first wires extending therealong, said second routing means including a plurality of passageways extending from the first end of said primary structure to a different two of said connectors, said second routing means further including second means for relieving strain on said second wires extending therealong.

* * * * *